(12) United States Patent
Park et al.

(10) Patent No.: US 12,441,670 B2
(45) Date of Patent: Oct. 14, 2025

(54) METHOD FOR PRODUCING OLEFINS USING NOVEL CATALYST AND CIRCULATING FLUIDIZED BED PROCESS

(71) Applicants: SK GAS CO., LTD., Seongnam-si (KR); KOREA RESEARCH INSTITUTE OF CHEMICAL TECHNOLOGY, Daejeon (KR)

(72) Inventors: Daesung Park, Daejeon (KR); Hawon Park, Daejeon (KR); Changyeol Song, Daejeon (KR); Eun Sang Kim, Daejeon (KR); Yong Ki Park, Seoul (KR); Won Choon Choi, Daejeon (KR); Ung Gi Hong, Seongnam-si (KR); Miyoung Lee, Seongnam-si (KR); Hae Bin Shin, Seongnam-si (KR); Sanghyeon Park, Seongnam-si (KR); Deuk Soo Park, Seongnam-si (KR)

(73) Assignees: SK GAS CO., LTD., Seongnam-si (KR); KOREA RESEARCH INSTITUTE OF CHEMICAL TECHNOLOGY, Daejeon (KR)

( * ) Notice: Subject to any disclaimer, the term of this patent is extended or adjusted under 35 U.S.C. 154(b) by 74 days.

(21) Appl. No.: 18/269,165

(22) PCT Filed: Nov. 16, 2021

(86) PCT No.: PCT/KR2021/016807
§ 371 (c)(1),
(2) Date: Jun. 22, 2023

(87) PCT Pub. No.: WO2022/139183
PCT Pub. Date: Jun. 30, 2022

(65) Prior Publication Data
US 2024/0300871 A1    Sep. 12, 2024

(30) Foreign Application Priority Data

Dec. 22, 2020    (KR) .................... 10-2020-0181158

(51) Int. Cl.
*C07C 5/32* (2006.01)
*C07C 7/00* (2006.01)

(52) U.S. Cl.
CPC .............. *C07C 5/325* (2013.01); *C07C 7/005* (2013.01); *C07C 2521/02* (2013.01);
(Continued)

(58) Field of Classification Search
CPC ..... C07C 5/325; C07C 7/005; C07C 2521/02; C07C 2521/04; C07C 2523/42;
(Continued)

(56) References Cited

U.S. PATENT DOCUMENTS

2004/0225165 A1*  11/2004  Allison .................. C07C 29/06
                                              568/910.5
2019/0330125 A1*  10/2019  Park ...................... B01J 23/92

FOREIGN PATENT DOCUMENTS

KR        10-1527845 B1    6/2015
KR     10-2018-0133695 A   12/2018
KR     10-2020-0083760 A    7/2020

OTHER PUBLICATIONS

International Search Report for PCT/KR2021/016807 mailed Mar. 23, 2022 from Korean Intellectual Property Office.
(Continued)

*Primary Examiner* — Thuan D Dang
(74) *Attorney, Agent, or Firm* — Paratus Law Group, PLLC

(57) ABSTRACT

A method for producing olefins using a circulating fluidized bed process, includes: supplying a propane-containing hydrocarbon mixture and a dehydrogenation catalyst into a riser, which is a fast fluidization regime, to cause a dehy-
(Continued)

drogenation reaction; separating, from a propylene mixture, the catalyst which is a product of the dehydrogenation reaction; removing unseparated hydrocarbon compounds remaining in the catalyst separated in the separating; continuously regenerating the catalyst by mixing the catalyst stripped in the removing with a gas containing oxygen; circulating the catalyst regenerated in the continuously regenerating to the supplying and resupplying it into the riser; and preparing propylene by cooling, compressing, and separating the propylene mixture which is a reaction product separated in the separating.

20 Claims, 6 Drawing Sheets

(52) U.S. Cl.
CPC ...... *C07C 2521/04* (2013.01); *C07C 2523/42* (2013.01); *C07C 2523/89* (2013.01)

(58) Field of Classification Search
CPC ....... C07C 2523/89; C07C 5/333; C07C 2/24; C07C 2/76; C07C 11/107; B01J 23/00; B01J 23/42; B01J 23/75; B01J 37/02; Y02P 20/584
See application file for complete search history.

(56) References Cited

OTHER PUBLICATIONS

Korean Office Action for related KR Application No. 10-2020-0181158 mailed Jan. 30, 2023 from Korean Intellectual Property Office.

Mostafa Aly et al., "Effect of Boron Promotion on Coke Formation during Propane Dehydrogenation over $Pt/\gamma-Al_2O_3$ Catalysts", ACS Catalysis, Apr. 6, 2020, pp. 5208-5216, vol. 10.

Yihu Dai et al., "$\gamma-Al_2O_3$ sheet-stabilized isolate $Co^{2+}$ for catalytic propane dehydrogenation", Journal of Catalysis, Dec. 13, 2019, pp. 482-492, vol. 381.

* cited by examiner

METHOD FOR PRODUCING OLEFINS USING NOVEL CATALYST AND CIRCULATING FLUIDIZED BED PROCESS

CROSS-REFERENCE TO PRIOR APPLICATIONS

This application is a National Stage Patent Application of PCT International Application No. PCT/KR2021/016807 (filed on Nov. 16, 2021), which claims priority to Korean Patent Application No. 10-2020-0181158 (filed on Dec. 22, 2020), which are all hereby incorporated by reference in their entirety.

BACKGROUND

The present invention relates to a method for producing olefins using a circulating fluidized bed process.

Olefins such as ethylene and propylene are widely used in the petrochemical industry. In general, these olefins are obtained in the naphtha thermal cracking process. However, as shale gas production surged and the price competitiveness of gas feed improved compared to naphtha, implementation of the ethane thermal cracking process increased rapidly. As a result, while ethylene supply increased and propylene production relatively slowed, an imbalance between propylene supply and demand was exhibited. Therefore, manufacturing technology of "on purpose propylene" for controlling the supply and demand of propylene, that is, special purpose propylene, is becoming widespread, and propylene production through the dehydrogenation process of lower hydrocarbons using a catalyst is required as an important technology.

The existing propane dehydrogenation (PDH) commercial process typically includes a fixed-bed reactor and a moving-bed reactor.

In contrast, there have been no commercialization cases in PDH technology (FPDH, fast-fluidized propane dehydrogenation) using a fast fluidized bed (hereinafter referred to as a fluidized bed) reactor until now.

The biggest difference between the fixed-bed reactor and the fluidized bed reactor is a contact time between the catalyst and the reactant (propane). In other words, the fluidized bed reactor is a process in which propane and a catalyst are injected together into the fluidized bed reactor at a very high rate to perform the reaction, and then the catalyst goes into the regeneration unit and the product goes into the separation unit.

In the process of producing olefins from a hydrocarbon feed mixture through a circulating fluidized bed process, setting the operating conditions of the riser where the dehydrogenation reaction is mainly performed may be considered an important factor in order to produce olefins selectively such as ethylene and propylene with high conversion rate and high selectivity. In particular, since the flow phenomenon and reaction phenomenon in the riser can be more easily understood through the following theoretical considerations, they will be described in more detail below.

As shown in FIG. 1, when gas is introduced from below into a container filled with a solid catalyst, the particles are fluidized, and when the minimum fluidization velocity is exceeded, the fluidization flow regime is generally divided into five regions.

Specifically, these are called a minimum fluidization regime, a bubbling fluidization regime, a slugging fluidization regime, a turbulent fluidization regime, and a lean phase fluidization with pneumatic transport regime, and there are differences in particle movement characteristics in each region.

Therefore, in the case of a process using a fluidized bed reactor, a suitable fluidization flow regime for each process characteristic is created and operated.

FIG. 2 shows the change in the volume fraction of the catalyst in the reactor according to the change in the riser height, that is, the fluidization flow regime. It is confirmed that there is a change in the catalyst volume fraction in the reactor according to the change in the fluidization flow regime. However, since the catalyst volume fraction in a reaction involving a catalyst, such as a fluidized bed catalytic dehydrogenation process, has an important effect on the performance of the process, the operating conditions of the process of determining the fluidization flow regime depending on the catalyst volume fraction in the reactor are very importantly influence the reaction result.

In order to determine the fluidization flow regime of the riser of such a circulating fluidization process, the following factors should be considered, and these factors may include the size of the catalyst, the circulation rate of the catalyst, the ratio of feedstock and catalyst, the strength of the catalyst, and the like.

In addition, the following factors that directly affect the dehydrogenation reaction should be considered, and these factors may include reaction temperature, heat of reaction, reaction time, deactivation of catalyst due to coke production, and the like.

The goal of the FPDH process that has conventionally been developed is to set the residence time of the catalyst to 10 seconds or less. If the residence time of the catalyst is short, the injection rate of propane is also fast, and the catalyst is immediately regenerated and participates in the reaction again. Therefore, when the FPDH process is developed as a commercial process, propylene output is greatly increased compared to the fixed bed process.

However, since the contact time between the catalyst and propane is short, the efficiency of the catalyst becomes very important. In other words, it is important to maximize the selectivity and conversion rate, which are two efficiency measures of the catalyst, respectively.

Furthermore, since the propane dehydrogenation process technologies that are currently being used are configured based on noble metal catalysts or a non-continuous process, there are difficulties in propylene production operation such as a reactor clogging phenomenon due to excessive activity (coke production) of noble metal catalysts, fixed-bed reactor valve sequence troubles, and the like.

In addition, the propane dehydrogenation reaction has a thermodynamical limitation in the propane conversion rate due to a reversible reaction by hydrogen. In order to overcome such a problem, most processes use external oxidizers such as oxygen, halogen, sulfur compounds, carbon dioxide, steam, and the like to convert hydrogen into water.

Therefore, for effective mass production of propylene, it is required to develop a new propane dehydrogenation process that solves the problems of the continuous process, and reduces production cost by using a direct-type dehydrogenation catalyst without an oxidizer.

Among the catalysts used for propane dehydrogenation, the reaction proceeds with a direct dehydrogenation mechanism in which hydrogen is adsorbed on the active site in the case of noble metal catalysts, but the mechanism has not been clearly identified due to the incompleteness of the active site due to the mobility of electrons in the case of transition metal oxides.

The most used catalysts as usual PDH catalysts are Pt—Sn, VOx, and CrOx catalysts. Although the CrOx catalyst is very excellent in terms of propane conversion rate and selectivity, its use is limited due to problems such as environmental pollution and human harm, and difficulties in controlling the oxidation reaction in the initial stage of the reaction. The platinum catalyst has excellent selectivity, but it is expensive, and the rate of coke production is very fast so that detailed control thereof is required. In addition, the intrinsic catalytic activity varies depending on the combination of Sn, which is a cocatalyst component, and other metals, and the development of a new multi-component catalyst is continuously required also for platinum catalysts due to the increase in environmental hazards of Sn.

However, since the residence time of the catalyst is within 10 seconds in the fluidized bed reactor, CO2 generation by the complete oxidation of propane on the transition metal oxide catalyst at the beginning of the reaction becomes a major problem, and it is essential to control the oxidation degree level of the transition metal in order to increase propylene selectivity. After all, since the reaction time is short in the case of the FPDH process using a fluidized bed reactor, the selectivity issue is very important.

Therefore, in the present invention, while researching a method for producing olefins using a circulating fluidized bed process that is superior in economics and productivity to existing manufacturing processes and a catalyst thereof, a catalyst for olefin production having excellent conversion rate and selectivity of the catalyst at the same time was applied to the circulating fluidized bed process, and the reaction conditions were improved, thereby developing a more efficient olefin production method and completing the invention.

SUMMARY

The present invention is to provide a olefin production method using a fluidized bed process with excellent economics and productivity compared to conventional processes.

A method for producing olefins using a circulating fluidized bed process according to the present invention includes:
- a step (a) of supplying a propane-containing hydrocarbon mixture and a dehydrogenation catalyst into a riser, which is a fast fluidization regime, to cause a dehydrogenation reaction;
- a step (b) of separating, from a propylene mixture, the catalyst which is a product of the dehydrogenation reaction;
- a stripping step (c) of removing unseparated hydrocarbon compounds remaining in the catalyst separated in the step (b);
- a step (d) of continuously regenerating the catalyst by mixing the catalyst stripped in the step (c) with a gas containing oxygen;
- a step (e) of circulating the catalyst regenerated in the step (d) to the step (a) and resupplying it into the riser; and
- a step (f) of preparing propylene by cooling, compressing, and separating the propylene mixture which is a reaction product separated in the step (b),
- wherein the dehydrogenation catalyst is one in which active metals including cobalt and platinum are supported on an alumina support modified with boron, and the fast fluidization regime is a steady state in which the catalyst continuously flows into the riser in a fixed amount while maintaining the gas flow rate within the riser to be higher than the turbulent fluidization regime and lower than the lean phase fluidization with pneumatic transport regime, and is preferably a fluidization regime in which a dense region in the bottom of the riser and a dilute region in the top of the riser are present.

It is preferable that in the fast fluidization regime, a) while the gas velocity is kept to be not less than the gas flow rate required for the catalyst continuously flown in from the bottom of the riser to be entrained and smoothly escape to the top of the riser, b) the gas flow rate and the catalyst inflow rate are adjusted so that the difference between the catalyst volume fractions at both points is maintained to be 0.02 to 0.04.

It is preferable that the difference in catalyst volume fraction between a ¼ point and a ¾ point of the lower part within the riser is maintained to be 0.02 to 0.04.

It is preferable that the hydrocarbon mixture contains 90% by weight or more of propane, more preferably 95% by weight or more.

The catalyst temperature at the inlet of the riser is 550 to 700° C., more preferably 620 to 680° C., and the temperature at the bottom of the riser is preferably maintained to be higher than the temperature at the top of the riser.

It is preferable that the riser has a pressure of 24 to 26 psig.

The residence time during which the hydrocarbon mixture stays for the dehydrogenation reaction within the riser is preferably 1 to 6 seconds, more preferably 2.5 to 4.5 seconds.

The weight ratio obtained by dividing the weight of the catalyst resupplied to the bottom of the riser in the step (e) by the weight of the hydrocarbon mixture is preferably 10 to 50, more preferably 30 to 45.

The space velocity (WHSV, $h^{-1}$) of the gas relative to the weight of the catalyst flowing into the riser is preferably 2 to 40, more preferably 7 to 13.

It is preferable that the alumina support has a γ-θ phase at a production temperature of 550 to 850° C., which is not less than the dehydrogenation reaction temperature, and has a surface area of 100 to 300 $m^2/g$ in this range.

It is preferable that the alumina support has a pore size of 0.1 to 5 μm.

It is preferable that the alumina support has a pore volume of 0.4 to 0.6 $cm^3/g$.

It is preferable that the catalyst includes 0.1 to 2% by weight of boron, 2 to 10% by weight of cobalt, and 0.001 to 0.05% by weight of platinum.

The catalyst preferably has an average size of 20 to 200 microns, more preferably 60 to 120 microns.

The present invention relates to a circulating fluidized bed process for producing olefins from hydrocarbon feed by using the catalyst for producing olefins according to the present invention in a fast fluidized bed, and since the catalyst-feed contact in the fast region is good so that the conversion rate and yield increase, the production of olefins can be increased more efficiently.

That is, in the circulating fluidized bed process according to the present invention, the incremental profit per feed increases since the yield is improved compared to the existing commercial processes, and fuel consumption is reduced by 10 to 15%, and compressor energy essential for product separation and catalyst regeneration is reduced by 15-20% compared to the commercial processes, reducing overall production costs since a continuous reaction-regeneration fluidized bed reactor is used so that a small air flow rate and a small air compressor are required by a direct heat supply method in the regeneration process.

DETAILED DESCRIPTION

Figure 1:
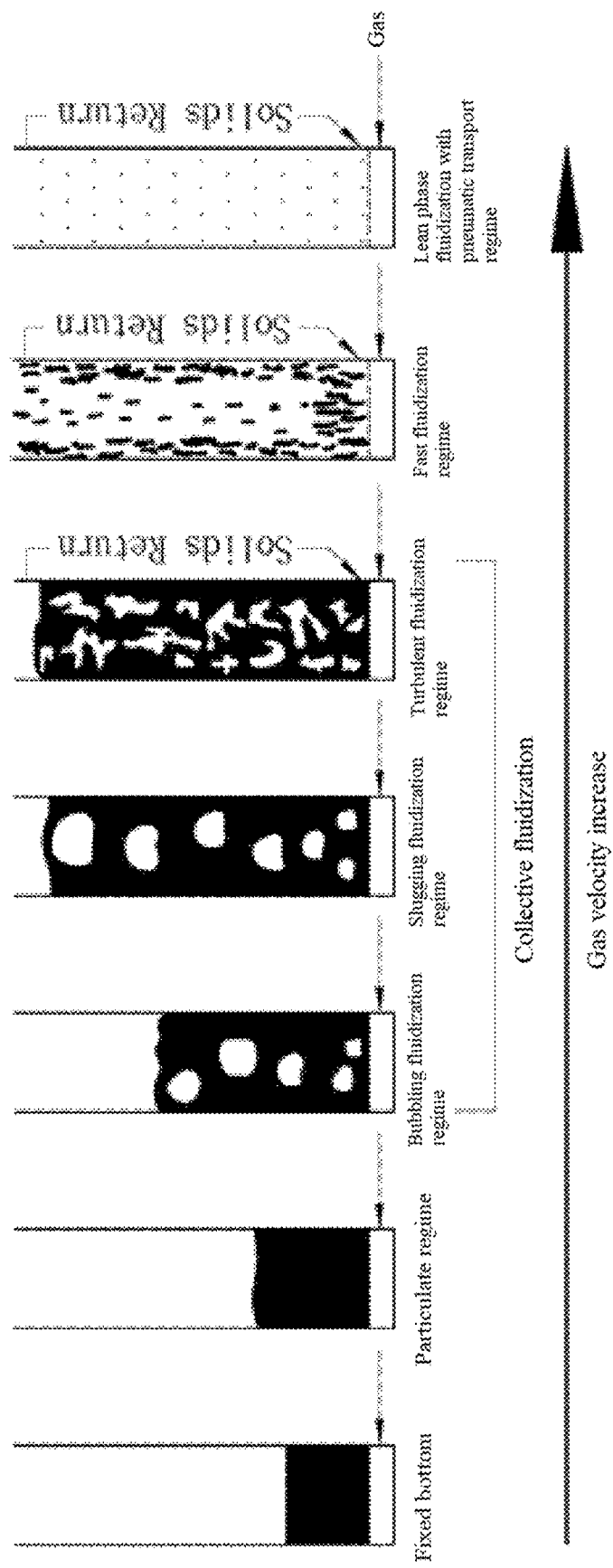
FIG. 1 is a view explaining the change in characteristics inside a fluidized bed with respect to a fluidization flow regime according to a change in general gas velocity.
Figure 2:
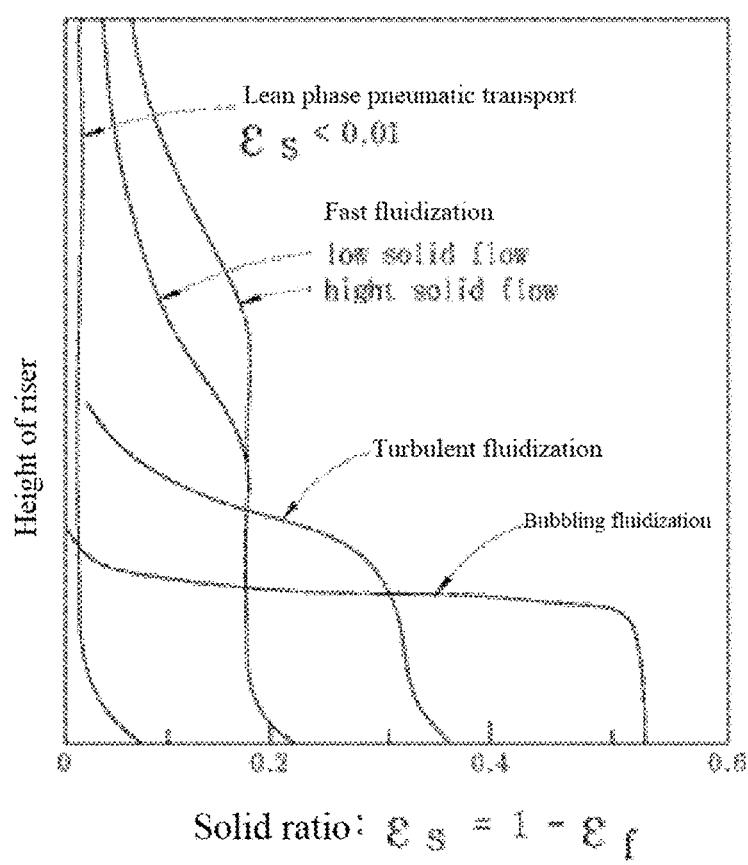
FIG. 2 is a view showing the catalyst volume fraction inside the fluidized bed according to the height of the riser.

A method for producing olefins using a circulating fluidized bed process according to the present invention includes:
- a step (a) of supplying a propane-containing hydrocarbon mixture and a dehydrogenation catalyst into a riser, which is a fast fluidization regime, to cause a dehydrogenation reaction;
- a step (b) of separating, from a propylene mixture, the catalyst which is a product of the dehydrogenation reaction;
- a stripping step (c) of removing unseparated hydrocarbon compounds remaining in the catalyst separated in the step (b);
- a step (d) of continuously regenerating the catalyst by mixing the catalyst stripped in the step (c) with a gas containing oxygen;
- a step (e) of circulating the catalyst regenerated in the step (d) to the step (a) and resupplying it into the riser; and
- a step (f) of preparing propylene by cooling, compressing, and separating the propylene mixture which is a reaction product separated in the step (b),
- wherein the dehydrogenation catalyst is one in which active metals including cobalt and platinum are supported on an alumina support modified with boron, and
- the fast fluidization regime is a steady state in which the catalyst continuously flows into the riser in a fixed amount while maintaining the gas flow rate within the riser to be higher than the turbulent fluidization regime and lower than the lean phase fluidization with pneumatic transport regime, and is preferably a fluidization regime in which a dense region in the bottom of the riser and a dilute region in the top of the riser are present.

Hereinafter, preferred embodiments of the present invention will be described with reference to the accompanying drawings. However, the embodiments of the present invention may be modified in various different forms, and the scope of the present invention is not limited to the embodiments described below.

In describing the present embodiments, the same names and reference numerals are used for the same components, and thus overlapping additional descriptions are omitted below. Scale ratios are not applied in the drawings referred to below.

The method for producing olefins using a circulating fluidized bed process according to the present invention includes:
- a step (a) of supplying a propane-containing hydrocarbon mixture and a dehydrogenation catalyst into a riser, which is a fast fluidization regime, to cause a dehydrogenation reaction;
- a step (b) of separating, from a propylene mixture, the catalyst which is a product of the dehydrogenation reaction;
- a stripping step (c) of removing unseparated hydrocarbon compounds remaining in the catalyst separated in the step (b);
- a step (d) of continuously regenerating the catalyst by mixing the catalyst stripped in the step (c) with a gas containing oxygen;
- a step (e) of circulating the catalyst regenerated in the step (d) to the step (a) and resupplying it into the riser; and
- a step (f) of preparing propylene by cooling, compressing, and separating the propylene mixture which is a reaction product separated in the step (b),
- wherein the dehydrogenation catalyst is one in which active metals including 2 to 10% by weight of cobalt and 0.001 to 0.05% by weight of platinum are supported on an alumina support modified with 0.1 to 2% by weight of boron, and
- the fast fluidization regime is a steady state in which the catalyst continuously flows into the riser in a fixed amount while maintaining the gas flow rate within the riser to be higher than the turbulent fluidization regime and lower than the lean phase fluidization with pneumatic transport regime, and is preferably a fluidization regime in which a dense region in the bottom of the riser and a dilute region in the top of the riser are present.

Hereinafter, an embodiment of the catalytic cracking process according to the present invention will be described in more detail through accompanying FIG. 3, but the scope of the present invention is not limited thereto.

The feedstock of the hydrocarbon mixture described above is supplied through the line 11 of FIG. 3, and at this time, it may be heated and supplied at a temperature of 300 to 600° C. for a smoother reaction. In addition, it may be supplied as a gas or in a dispersed liquid state depending on the components of the feedstock, but is not particularly limited thereto.

The feedstock of the line 11 flows into the riser 1, which is a reaction zone, and is mixed with the regenerated catalyst supplied through the regenerator stand pipe of the line 13 from the bottom of the riser 1. In addition, the mixing process of the feedstock and the regenerated catalyst can be configured in various ways known in the art, and all of these configurations are included in the scope of the present invention.

Meanwhile, the catalyst used during the process is regenerated in the regenerator 3, the regenerated catalyst is supplied to the riser 1 through the line 13, and the catalyst temperature at the inlet of the riser at this time is preferably maintained at 550 to 700° C., more preferably 620 to 680° C. That is, the feedstock 1 is raised to a temperature required for the dehydrogenation reaction due to the amount of heat supplied by the regeneration catalyst 13. When the temperature at the bottom of the riser is less than 550° C., the conversion rate of the catalyst is lowered, and at a temperature of more than 700° C., the selectivity of the catalyst is lowered by the increase in by-products due to thermal decomposition of the hydrocarbon mixture as a feed.

Subsequently, the feedstock and the dehydrogenation catalyst mixed at the bottom of the riser 1 are fluidized and flowed upward while the dehydrogenation reaction is accompanied in the riser 1. At this time, as the dehydrogenation reaction, which is an endothermic reaction, proceeds, the temperature of the mixture decreases, and the temperature of the top of the riser 1 decreases relatively.

The reaction product and the catalyst reaching the top of the riser 1 flow into the stripper 2, and thus the gaseous reaction product and the solid catalyst are separated within a short time. A cyclone is optionally used to increase the efficiency of this separation process.

The reaction product, which is in a separated gas state, is discharged through the line 15, and the separated catalyst moves in a downward direction while it is being accumulated in the stripper 2. At this time, stripping steam is supplied to the bottom of the stripper 2 through a line 16, and while the stripping steam 16 is being moved to the top thereof along the stripper 2, it removes unseparated hydrocarbon reaction products contained in the catalyst, and they are discharged to the gas reaction product line (15).

The catalyst reaching the bottom inside the stripper 2 is moved to the regenerator 3 through the stripper stand pipe of the line 17 by the adjustment of the slide valve 18. At this time, the catalyst may also contain coke generated during the reaction. A gas such as air or the like containing oxygen flows into the regenerator 3 through a line 20, and the coke contained in the catalyst reacts with oxygen at a high temperature of 500° C. or higher so that while being converted to carbon monoxide or carbon dioxide, it is discharged as exhaust gas through the line 19, and as a result, the content of coke contained in the catalyst may be significantly lowered.

Meanwhile, the regenerated catalyst present in the lower part of the regenerator 3 may be recycled within the process while flowing back into the riser through the regenerator stand pipe of the line 13 by the adjustment of the slide valve 21.

In the process according to the present invention, a hydrocarbon mixture, specifically, a hydrocarbon mixture containing 90% by weight or more of propane may be used as a feedstock. More preferably, it is preferable to contain 95% by weight of propane. When the concentration of propane is low, catalyst selectivity is lowered due to side reactions of other impurities, and thus productivity is reduced.

In the present invention, the dehydrogenation catalyst that can be used to dehydrogenate the feedstock is generally not particularly limited as long as it is known in the art as being capable of converting hydrocarbon compounds into olefins through a dehydrogenation reaction, but it is preferable that an active metal containing 2 to 10% by weight of cobalt and 0.001 to 0.05% by weight of platinum is supported on an alumina support modified with 0.1 to 2% by weight of boron.

If boron is contained in an amount of less than 0.1% by weight, there is a disadvantage of lowering the propylene selectivity, and if it is contained in an amount exceeding 2% by weight, there is a disadvantage of lowering the conversion rate so that it is not preferable.

If cobalt is contained in an amount of less than 2% by weight, there is a disadvantage of lowering the conversion rate, and if it is contained in an amount exceeding 10% by weight, there is a disadvantage of lowering the conversion rate and propylene selectivity so that it is not preferable.

If platinum is contained in an amount of less than 0.001% by weight, there is no effect of the platinum cocatalyst, and if it is contained in an amount exceeding 0.05% by weight, there is a disadvantage of lowering the propylene selectivity due to a rapid increase in by-products (methane, ethane, etc.) so that it is not preferable.

The alumina support preferably has a γ-θ phase at a production temperature of 550 to 850° C., which is not less than the dehydrogenation reaction temperature, and has a surface area of 100 to 300 $m^2/g$ in this range.

When the support is prepared at a temperature lower than the dehydrogenation reaction temperature, thermal deformation of the catalyst may occur during the dehydrogenation reaction, and when the support is prepared at a temperature exceeding 850° C., it has a low catalyst surface area due to crystallization of the support, and this inhibits mass transfer for catalytic activity upon contact with reactants.

It is preferable that the alumina support has a pore size of 0.1 to 5 μm. If the pore size is smaller than the above range, diffusion of propane gas into the active species in the pores is not easy so that reactivity may be decreased, and fluidity may be reduced. Since there is a disadvantage in that the catalyst strength is weakened if the pore size is too large, it is not preferable.

Furthermore, it is preferable that the catalyst has an average size of 20 to 200 microns, and it is more preferable that it has an average size belonging to a range of 60 to 120 microns. For the high-efficiency catalytic reaction, appropriate fast fluidization regime flow between the turbulent fluidization regime and the lean phase fluidization regime is required. In the catalyst size region of less than 20 microns, the lean-phase flow dominates so that the yield may be lowered due to high space velocity. In addition, in the catalyst size region of more than 200 microns, the product production rate is lowered due to too slow circulating flow so that a very large catalyst reaction facility is required to maintain the same productivity, and investment economics are lowered.

As already mentioned, the dehydrogenation reaction for converting hydrocarbon feed compounds into olefins takes place in the riser 1, and therefore, the main reaction conditions affecting the yield of olefins include the temperature of the riser, the residence time of the reactants within the riser, volume fraction and distribution of the catalyst in the riser, etc., and are described in more detail below.

First, the temperature of the riser is the highest temperature at the bottom, and the temperature decreases toward the top. In addition, in the circulating fluidized bed following the continuous reaction-regeneration process, the temperature at the top of the riser determines the regeneration temperature. Therefore, in the present invention, it is effective that the temperature of the catalyst at the bottom of the riser is maintained at 550 to 700° C., more preferably at 580 to 650° C. A temperature of 550° C. or lower may indicate a decrease in initial activity of the catalyst, and a temperature of 700° C. or higher may cause thermal decomposition of feed in the riser, resulting in a loss of feedstock. In addition, it is effective that the temperature of the top of the riser is maintained at 500 to 650° C., more preferably at 550 to 620° C. Since a temperature of the top of 500° C. or lower may hinder temperature recovery in the regeneration unit process of the circulating fluidized bed reactor, and a temperature of 650° C. or higher may cause an overheating phenomenon in the catalyst coke removal step of the regeneration unit, it impossible to control the temperature at the bottom of the riser. However, for the purpose of a smooth flow, the temperature at the bottom of the riser should be maintained higher than the temperature at the top of the riser.

Meanwhile, the riser is preferably maintained at a pressure of 24 to 26 psig. The pressure of the riser represents the reaction pressure, and when it is lower than 24 psig, the compression energy for separating a product from the reaction product increases, and the investment cost for compression equipment also increases, resulting in lower overall economics. In addition, when the pressure of the riser is higher than 26 psig, the investment cost and compression energy for the compression equipment at the rear of the reactor are reduced, but a high-pressure reaction is induced in the riser, thereby reducing product yield. Therefore, an appropriate riser pressure within the above range is required.

In addition, in the case of a dehydrogenation process for producing olefins using the catalyst, the residence time of reactants within the riser may also be an important reaction condition for determining the yield and composition of olefins. As the dehydrogenation reaction proceeds through the riser, since the amount of time it stays in the riser determines the number of molecules and flow rate of the gas, a criterion for determining the residence time is required. Therefore, in the present invention, the residence time of the reactants within the riser was used as a standard for the value obtained by dividing the volume of the riser by the volume velocity of the gas flowing out from the top of the riser.

The dehydrogenation process of the effective hydrocarbon feed compounds within the riser according to the present invention is performed under conditions of a residence time of 1 to 6 seconds, preferably 2.5 to 4.5 seconds. If the residence time is lower than 1 second, sufficient contact time between the catalyst and the hydrocarbon feed cannot be had, resulting in a decrease in product yield, and if the residence time is higher than 6 seconds, an excessive investment cost of reactor equipment for realizing the fast fluidization regime required by the present invention are required.

In the present invention, the fluidized bed dehydrogenation reaction is an endothermic reaction, and the heat amount required for the reaction is supplied by recycling the catalyst at high temperatures. Therefore, in the present invention, the catalyst recycle amount more suitable for this purpose is effective when the weight ratio obtained by dividing the catalyst recycle weight by the weight of the feedstock (hydrocarbon mixture containing LPG) is in a range of 10 to 50, preferably 30 to 45.

If the weight ratio is less than 10, sufficient reaction contact time cannot be had since the space velocity with the hydrocarbon, which is a feedstock, is too high, and if it is higher than 50, an excessive investment cost of the reactor equipment for realizing the fast fluidization regime required in the present invention is required. In addition, since an excessive flow rate is caused in the catalyst regeneration unit and sufficient regeneration time cannot be had, a weight ratio obtained by dividing the weight of the appropriate catalyst within the above range by the weight of the hydrocarbon mixture is required.

In addition, the gas relative to the weight of the catalyst flowing into the riser preferably has a space velocity (WHSV) of 2 to 40 $h^{-1}$, more preferably 7 to 13 $h^{-1}$. When the space velocity is less than 2 $h^{-1}$, the reaction conversion rate increases, but the selectivity decreases, and when the space velocity is 40 $h^{-1}$ or more, the selectivity increases, but the conversion rate decreases.

Meanwhile, as described above, the volume fraction and distribution of the catalyst within the riser are greatly influenced by the fluidization flow regime, and at this time, the fluidization flow regime is determined by the gas velocity within the riser and the injection speed of the catalyst flowing into the riser.

According to the circulating fluidized bed process of the present invention, in order to produce effectively an olefinic hydrocarbon compound from a hydrocarbon feed mixture, it is important to provide sufficient volume fraction and distribution of the catalyst at which the dehydrogenation reaction can occur by maintaining the fluidization regime of the riser as a fast fluidization regime.

Therefore, a clearer definition of the range of the fast fluidization regime is required. To this end, the turbulent fluidization regime and the lean phase fluidization with pneumatic transport regime, which are adjacent fluidization regimes, may be comparatively explained. First, as the gas flow rate increases in the turbulent fluidization regime, solid particles are significantly entrained and exit the riser so that they are transferred to the fast fluidization regime. Therefore, in order to maintain a certain amount of catalyst within the riser at the gas velocity in the fast fluidization regime, the catalyst should be continuously flown in from the bottom of the riser. In the fast fluidization regime, the catalyst volume fraction changes depending on the height of the riser, and a dense region is present at the bottom of the riser, and a dilute region is present at the top of the riser.

Furthermore, if the speed of the rising gas further increases or the inflow itself of solid particles decreases in the fast fluidization regime, the catalyst volume within the riser decreases, and thus, the flow regime is changed to the lean phase fluidization with pneumatic transport regime. In the lean phase fluidization with pneumatic transport regime, the catalyst volume fraction has a very low value, and has a value that is almost constant depending on the height of the riser.

Here, the catalyst volume refers to a volume occupied by a catalyst except for space in a certain volume, and in the case of a porous catalyst, refers to a volume including macropores and micropores inside the catalyst.

Figure 3:
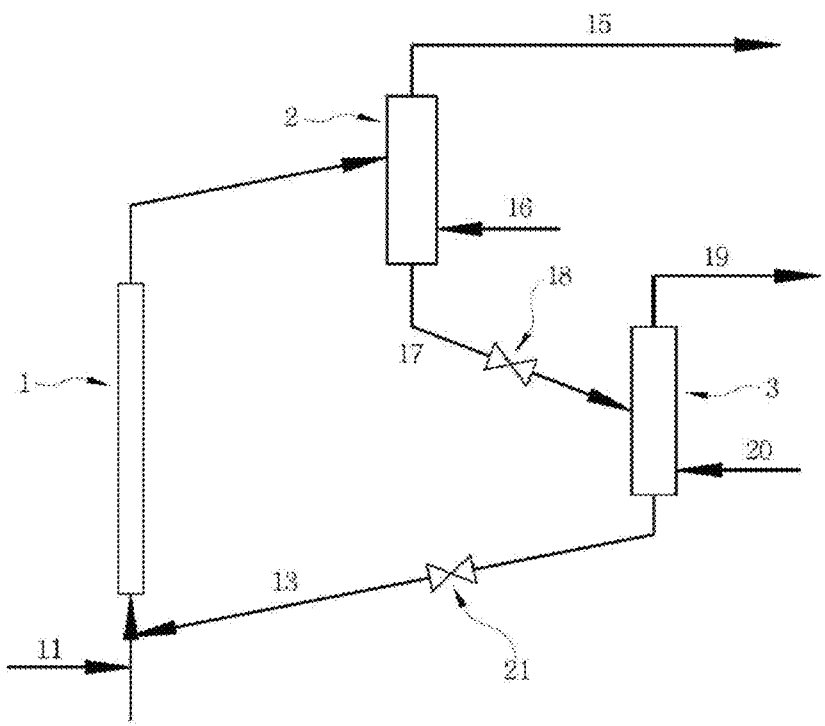
FIG. 3 is a view schematically explaining a circulating fluidized bed process used in the present invention.

According to Kunii and Levenspiel (1991, Fluidization Engineering), since entrainment of the catalyst exiting the riser proceeds rapidly in the fast fluidization regime, while writing that it is necessary to continuously inject the catalyst to maintain steady-state operating conditions, the characteristics of the fast fluidization regime are defined as follows as shown in FIG. 3.

The volume of the catalyst in the short part from the inlet at the bottom of the riser corresponds to a fraction of 0.2 to 0.4 of the volume of the riser.

As the height rises at the bottom of the riser, the volume of the catalyst up to a certain height has a constant value at a fraction of about 0.2. In addition, this part is called the dense region.

At the top of the riser that is not lower than the dense region, the volume of the catalyst gradually changes and exists at a fraction of 0.02 to 0.05.

The qualitative characteristics of the fast fluidization regime are the same depending on the change in the process, but the quantitative numerical value of the catalyst volume changes. The quantitative numerical value of the catalyst volume changes according to the physical properties of the catalyst, that is, the catalyst's inherent density and sphericity, and also changes according to the physical properties such as gas density and viscosity according to the change in gas type.

Therefore, the preferred fast fluidization regime that can be used in the circulating fluidized bed dehydrogenation process of hydrocarbon compounds according to the present invention is formed by maintaining a steady state in which a fixed amount of catalyst continuously flows into the riser while maintaining the gas flow rate within the riser to be higher than the turbulent fluidization regime and lower than the lean phase fluidization with pneumatic transport regime. At this time, the catalyst volume fraction changes depending on the height of the riser, and may be explained as meaning the fluidization regime in which the dense region exists at the bottom of the riser, and the dilute region exists at the top of the riser. More specifically, it may be formed and also defined as follows.

1) The gas velocity should be maintained to be not less than the gas flow rate required for the catalyst to be entrained and smoothly escape the top of the riser, and the catalyst should be capable of being continuously flown in from the bottom of the riser.

2) As the gas flow rate increases under the above conditions, the difference in catalyst volume fraction between a point corresponding to ¼ and a point corresponding to ¾ from the bottom within the riser decreases. The difference in catalyst volume fraction between the two points should be maintained to be 0.02 to 0.04 by adjusting the gas flow rate and catalyst inflow rate. The catalyst according to the present invention exhibits high efficiency catalytic reactivity, especially in the fast fluidization regime. If the difference in the volume fraction is less than 0.02, it may be close to the lean phase fluidization regime and cause yield reduction due to high space velocity, and since it becomes turbulent fluidization or bubbling fluidization if it exceeds 0.04, this is not desirable.

According to the present invention, in the process of producing olefinic hydrocarbons using a circulating fluidized bed process from a hydrocarbon mixture, which is a feedstock, preferably a hydrocarbon mixture containing 90% by weight or more of propane, if the operation is adjusted in the fast fluidization regime by controlling the gas velocity within the riser and the inflow rate of the catalyst flowing into the riser under the same conditions as described above, it may be possible to provide the maximum catalyst concentration within the riser at this time. Therefore, through this principle, it may be possible to provide high conversion rate and high selectivity of olefinic hydrocarbons, more preferably propylene.

<Catalyst>

The catalyst used in the experiment is [(4% by weight of Cr+0.01% by weight of Pt)/0.7% by weight of B+alumina], alumina is commercial Puralox or KRICT-2 alumina, preferably having a pore size of 0.1 to 5 μm, and other physical properties are shown in Table 1 below.

TABLE 1

| | Density (g/mL) | BET area (m²/g) | Pore volume (cm³/g) | Macropore size (μm) | Macropore volume (cm³/g) | Attrition index (%) |
|---|---|---|---|---|---|---|
| Puralox | 0.94 | 188.5 | 0.49 | — | 0.006 | 4.4 |
| KRICT-2 | 0.64 | 196.2 | 0.48 | 2 | 0.238 | 26.2 |

Hereinafter, examples of producing olefins using the catalyst will be described.

Example 1

In Example 1, a circulating fluidized bed process was used in order to measure the activity of the CPB/KRICT-2 catalyst during the olefin production process as shown in FIG. 3.

The circulating fluidized bed process consists of a riser, a regenerator, a stripper, and a stabilizer. The riser has a height of 7 m and a diameter of 0.94 cm, the regenerator has a height of 1.5 m and a diameter of 12 cm, the stripper has a height of 2 m and a diameter of 10 cm, and the stabilizer has a height of 1.7 m and a diameter of 15 cm.

At the inlet of the riser, a feedstock of a hydrocarbon mixture containing 90% by weight or more of propane, a dilution gas, and a catalyst are injected and mixed, and experimental conditions are shown in Table 2 below.

TABLE 2

| | | | |
|---|---|---|---|
| Catalyst temperature at riser inlet [° C.] | 640 | 650 | 660 |
| Feedstock [g/hr] | 420 | 420 | 420 |
| Catalyst circulation flow rate [g/hr] | 18000 | 18000 | 18000 |
| Catalyst/propane ratio | 43 | 43 | 43 |
| Pressure [psig] | 24.9 | 25 | 25.5 |
| Gas residence time RT [sec] | 3.80 | 3.76 | 3.77 |
| Solid residence time RT [sec] | 7.93 | 7.93 | 8.63 |
| WHSV [h⁻¹] | 10.6 | 10.6 | 9.7 |
| Temperature at the top of the riser [° C.] | 585 | 602 | 612 |
| Temperature at the bottom of the riser [° C.] | 610 | 623 | 635 |
| Conversion rate (% by weight) | 25.45 | 32.71 | 33.21 |
| Propylene selectivity (% by weight) | 89.54 | 88.20 | 85.23 |

In addition, in the case of Example 1, the dehydrogenation reaction occurred in the fluidized bed while passing through the riser, and the mixture passing through the riser was separated into catalyst and oil at 500 to 520° C. in a stripper, and the catalyst was circulated to the regenerator, and oil flowed into the stabilizer. The catalyst injected into the regenerator was regenerated at 630 to 690° C. by being in contact with air, and the regenerated catalyst was flown into the riser again. Meanwhile, oil flown into the stabilizer was separated into a gas component and a liquid component at 5 to 20° C.

Figure 4:
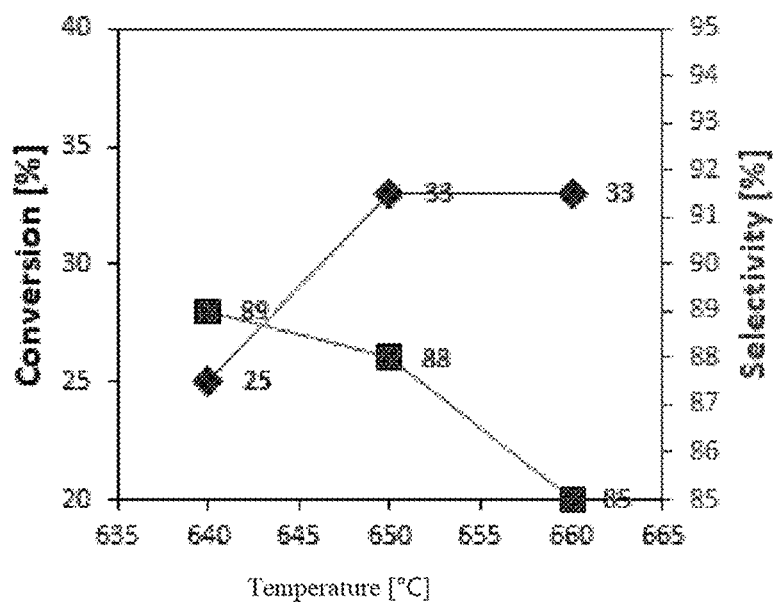
FIG. 4 schematically shows the results of experimenting the conversion rate and selectivity of the CPB/KRICT-2 catalyst according to the present invention depending on temperature changes.

Selectivity and conversion rate measured according to Example 1 are schematically shown in FIG. 4. According to a change in the catalyst temperature at the riser inlet, conversion rate increased from 25% to 33%, but selectivity decreased from 89% to 85%.

Example 2

In Example 2, the experiment was conducted in the same manner as in Example 1 except that only the operating conditions shown in Table 3 below were different.

TABLE 3

| Catalyst/propane ratio | 42 | 31 | 14 |
|---|---|---|---|
| Feedstock [g/hr] | 420 | 420 | 420 |
| Catalyst circulation flow rate [g/hr] | 18000 | 13000 | 6000 |
| Catalyst temperature at riser inlet [° C.] | 650 | 650 | 650 |
| Pressure [psig] | 25 | 25 | 25.2 |
| Gas residence time RT [sec] | 3.76 | 3.76 | 3.78 |
| Solid residence time RT [sec] | 7.93 | 8.08 | 6.44 |
| WHSV [h$^{-1}$] | 10.6 | 14.4 | 39.1 |
| Temperature at the top of the riser [° C.] | 602 | 596 | 589 |
| Temperature at the bottom of the riser [° C.] | 623 | 618 | 589 |
| Conversion rate (% by weight) | 32.71 | 31.84 | 25.78 |
| Propylene selectivity (% by weight) | 88.20 | 89.95 | 91.46 |

Figure 5:
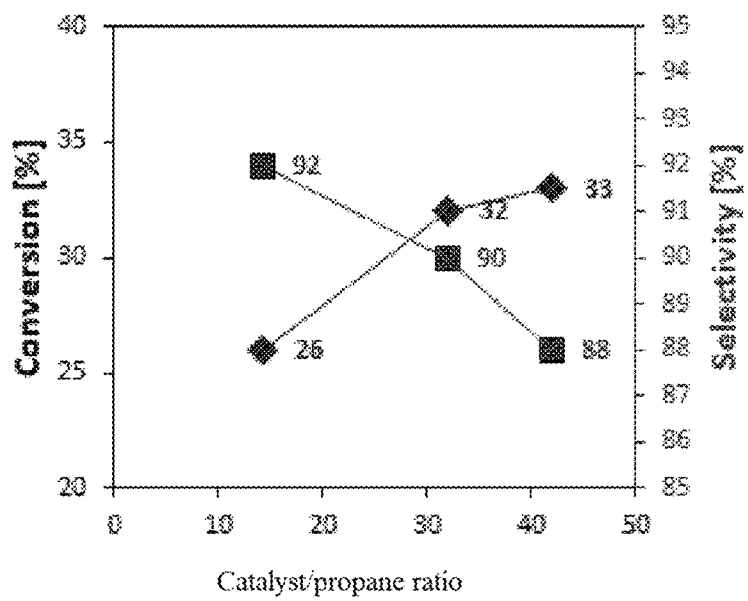
FIG. 5 schematically shows the results of experimenting the conversion rate and selectivity of the CPB/KRICT-2 catalyst according to the present invention depending on changes in the catalyst/propane ratio.

Selectivity and conversion rate measured according to Example 2 are schematically shown in FIG. 5. According to a change in the catalyst/propane ratio, conversion rate increased from 26% to 33%, but selectivity decreased from 92% to 88%.

Example 3

In Example 3, the experiment was conducted in the same manner as in Example 1 except that the CPB/Puralox catalyst was used and only the operating conditions shown in Table 4 below were different.

TABLE 4

| Catalyst temperature at riser inlet [° C.] | 640 | 650 |
|---|---|---|
| Feedstock [g/hr] | 420 | 420 |
| Catalyst circulation flow rate [g/hr] | 18000 | 18000 |
| Catalyst/propane ratio | 43 | 43 |
| Pressure [psig] | 25.3 | 25.2 |
| Gas residence time RT [sec] | 3.83 | 3.78 |
| Solid residence time RT [sec] | 11.66 | 11.20 |
| WHSV [h$^{-1}$] | 7.2 | 7.5 |
| Temperature at the top of the riser [° C.] | 589 | 599 |
| Temperature at the bottom of the riser [° C.] | 614 | 624 |
| Conversion rate (% by weight) | 32.51 | 35.06 |
| Propylene selectivity (% by weight) | 88.07 | 86.99 |

Figure 6:
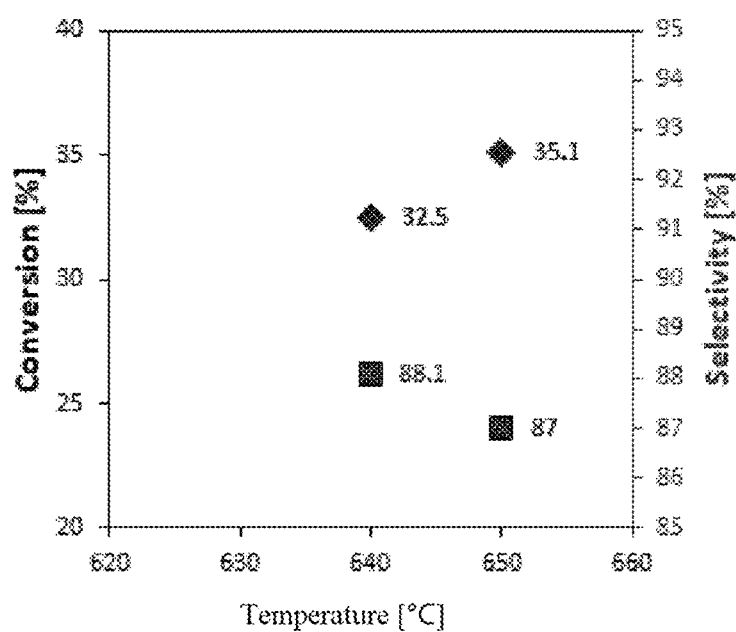
FIG. 6 schematically shows the results of experimenting the conversion rate and selectivity of the CPB/Puralox catalyst according to the present invention depending on temperature changes.

Selectivity and conversion rate measured according to Example 3 are schematically shown in FIG. 6. According to a change in the catalyst temperature at the riser inlet, conversion rate increased from 32.5% to 35.1%, but selectivity decreased from 88.1% to 87%.

Example 4

In Example 4, the experiment was conducted in the same manner as in Example 1 except that the CPB/Puralox catalyst was used and only the operating conditions shown in Table 5 below were different.

TABLE 5

| Catalyst/propane ratio | 42 | 31 |
|---|---|---|
| Feedstock [g/hr] | 420 | 420 |
| Catalyst circulation flow rate [g/hr] | 18000 | 13000 |
| Catalyst temperature at riser inlet [° C.] | 650 | 650 |
| Pressure [psig] | 25.2 | 25.2 |
| Gas residence time RT [sec] | 3.78 | 3.78 |
| Solid residence time RT [sec] | 11.20 | 10.34 |
| WHSV [h$^{-1}$] | 7.5 | 11.3 |
| Temperature at the top of the riser [° C.] | 599 | 596 |
| Temperature at the bottom of the riser [° C.] | 624 | 620 |
| Conversion rate (% by weight) | 35.06 | 32.73 |
| Propylene selectivity (% by weight) | 86.99 | 89.63 |

Figure 7:
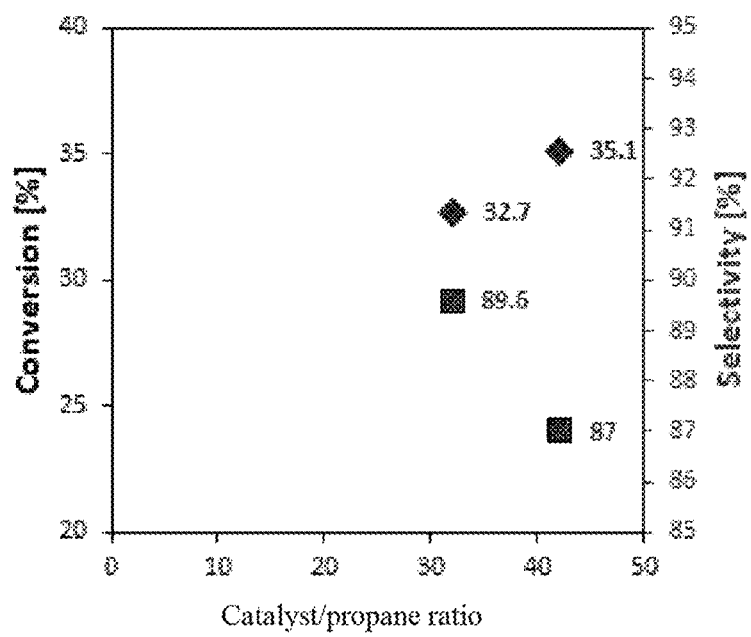
FIG. 7 schematically shows the results of experimenting the conversion rate and selectivity of the CPB/Puralox catalyst according to the present invention depending on changes in the catalyst/propane ratio.

Selectivity and conversion rate measured according to Example 4 are schematically shown in FIG. 7. According to a change in the catalyst/propane ratio, conversion rate increased from 32.7% to 35.1%, but selectivity decreased from 89.6% to 87%.

Example 5

In Example 5, the experiment was conducted in the same manner as in Example 1 except that the CPB/Puralox catalyst was used, the gas residence time was changed, and only the operating conditions shown in Table 6 below were different.

TABLE 6

| Gas residence time RT [sec] | 3.8 | 5.1 |
|---|---|---|
| Feedstock [g/hr] | 420 | 160 |
| Catalyst circulation flow rate [g/hr] | 18000 | 6500 |
| Catalyst/propane ratio | 43 | 41 |
| Pressure [psig] | 25.2 | 25.2 |
| Catalyst temperature at riser inlet [° C.] | 650 | 650 |
| Solid residence time RT [sec] | 11.20 | 27.13 |
| WHSV [h$^{-1}$] | 7.5 | 3.3 |
| Temperature at the top of the riser [° C.] | 599 | 593 |
| Temperature at the bottom of the riser [° C.] | 624 | 603 |
| Conversion rate (% by weight) | 35.06 | 38.88 |
| Propylene selectivity (% by weight) | 86.99 | 75.17 |

Figure 8:
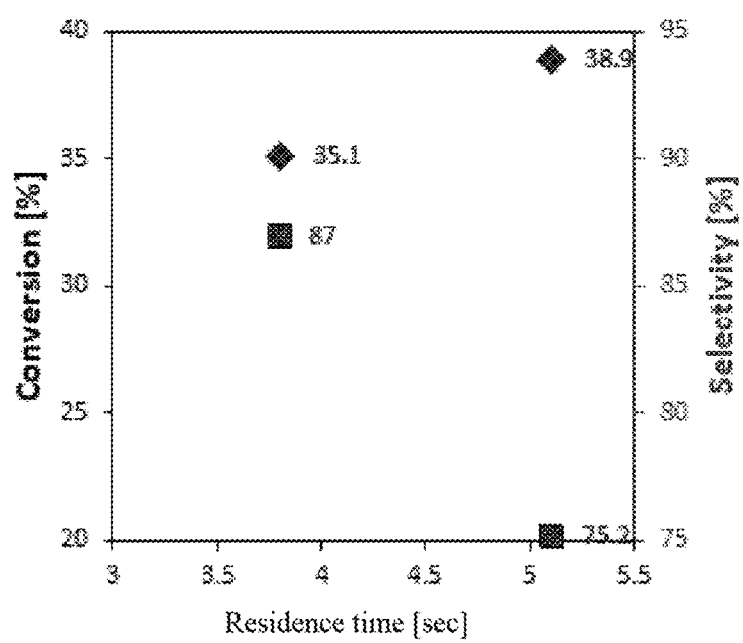
FIG. 8 schematically shows the results of experimenting the conversion rate and selectivity of the CPB/Puralox catalyst according to the present invention depending on changes in the residence time (RT).

Selectivity and conversion rate measured according to Example 5 are schematically shown in FIG. 8. According to a change in the catalyst/propane ratio, conversion rate increased from 35.1% to 38.9%, but selectivity decreased from 87% to 75.2%.

Example 6

Figure 9:
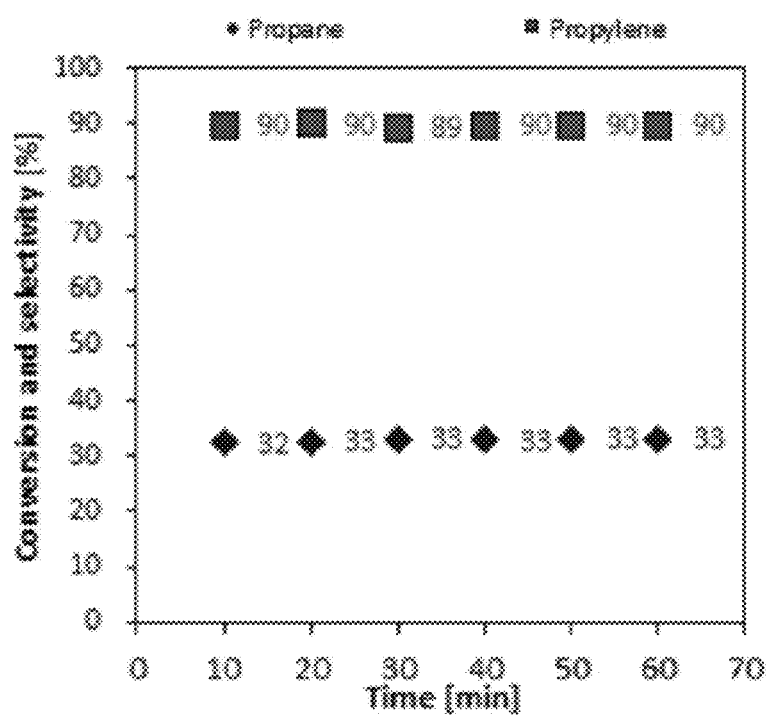
FIG. 9 schematically shows the results of experimenting the conversion rate and selectivity during the continuous process of the CPB/Puralox catalyst according to the present invention.
Figure 10:
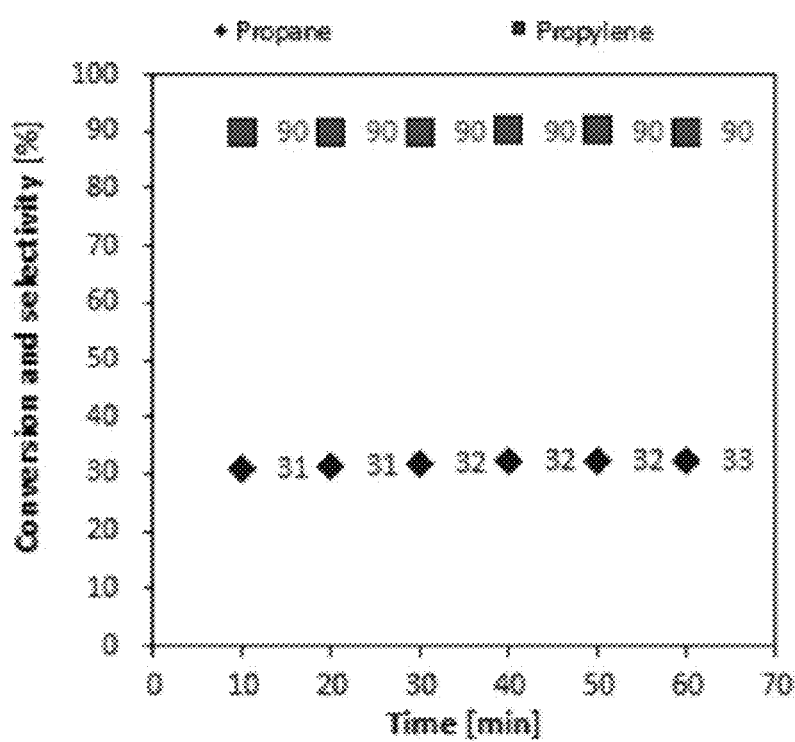
FIG. 10 schematically shows the results of experimenting the conversion rate and selectivity during the continuous process of the CPB/KRICT-2 catalyst according to the present invention.

In Example 1, when the catalyst temperature at the inlet of the riser was fixed at 650° C. and the catalyst/propane ratio was fixed at 31 and the continuous process was carried out, as shown in FIGS. 9 and 10, the selectivity was 90% and the conversion rate was 31 to 33% so that when comparing the yields of the reaction products, about 28 to 30% were obtained, and the incremental profit of the feed was increased so that the economic efficiency was remarkably improved.

Hereinabove, the embodiments of the present invention have been described in detail, but the scope of rights of the present invention is not limited thereto, and it will be apparent to those with ordinary skill in the art that various modifications and variations are possible within the scope without departing from the technical spirit of the present invention described in the claims.

DETAILED DESCRIPTION OF MAIN ELEMENTS

1: Riser
2: Stripper
3: Regenerator
11: Hydrocarbon feed supply line
13: Regenerator stand pipe
15: Gas reaction product
16: Stripping steam supply line
17: Stripper stand pipe
18: Stripper slide valve
19: Flue gas
20: Gas containing oxygen such as air or the like
21: Regenerator slide valve The present invention relates to a method for producing olefins using a circulating fluidized bed process.

The invention claimed is:

1. A method for producing olefins using a circulating fluidized bed process, the method comprising:
    a step (a) of supplying a propane-containing hydrocarbon mixture and a dehydrogenation catalyst into a riser, which is a fast fluidization regime, to cause a dehydrogenation reaction;
    a step (b) of separating, from a propylene mixture, the catalyst which is a product of the dehydrogenation reaction;
    a stripping step (c) of removing unseparated hydrocarbon compounds remaining in the catalyst separated in the step (b);
    a step (d) of continuously regenerating the catalyst by mixing the catalyst stripped in the step (c) with a gas containing oxygen;
    a step (e) of circulating the catalyst regenerated in the step (d) to the step (a) and resupplying it into the riser; and
    a step (f) of preparing propylene by cooling, compressing, and separating the propylene mixture which is a reaction product separated in the step (b),
    wherein the dehydrogenation catalyst is one in which active metals including cobalt and platinum are supported on an alumina support modified with boron, and
    the fast fluidization regime is a steady state in which the catalyst continuously flows into the riser in a fixed amount while maintaining the gas flow rate within the riser to be higher than the turbulent fluidization regime and lower than the lean phase fluidization with pneumatic transport regime, and is a fluidization regime in which a dense region in the bottom of the riser and a dilute region in the top of the riser are present.

2. The method of claim 1, wherein in the fast fluidization regime, a) while the gas velocity is kept not less than the gas flow rate required for the catalyst continuously flown in from the bottom of the riser to be entrained and smoothly escape to the top of the riser, b) the gas flow rate and the catalyst inflow rate are adjusted so that the difference between the catalyst volume fractions at both points is maintained to be 0.02 to 0.04.

3. The method of claim 2, wherein the difference in catalyst volume fraction between a ¼ point and a ¾ point of the lower part within the riser is maintained to be 0.02 to 0.04.

4. The method of claim 1, wherein the hydrocarbon mixture contains 90% by weight or more of propane.

5. The method of claim 1, wherein the catalyst temperature at the inlet of the riser is 550 to 700° C., and the temperature at the bottom of the riser is maintained to be higher than the temperature at the top of the riser.

6. The method of claim 1, wherein the catalyst temperature at the inlet of the riser is 620 to 680° C., and the temperature at the bottom of the riser is maintained to be higher than the temperature at the top of the riser.

7. The method of claim 1, wherein the riser has a pressure of 24 to 26 psig.

8. The method of claim 1, wherein the residence time during which the hydrocarbon mixture stays for the dehydrogenation reaction within the riser is 1 to 6 seconds.

9. The method of claim 1, wherein the residence time during which the hydrocarbon mixture stays for the dehydrogenation reaction within the riser is 2.5 to 4.5 seconds.

10. The method of claim 1, wherein the weight ratio obtained by dividing the weight of the catalyst resupplied to the bottom of the riser in the step (e) by the weight of the hydrocarbon mixture is 10 to 50.

11. The method of claim 1, wherein the weight ratio obtained by dividing the weight of the catalyst resupplied to the bottom of the riser in the step (e) by the weight of the hydrocarbon mixture is 30 to 45.

12. The method of claim 1, wherein the space velocity (WHSV, $h^{-1}$) of the gas relative to the weight of the catalyst flowing into the riser is 2 to 40.

13. The method of claim 1, wherein the space velocity (WHSV, $h^{-1}$) of the gas relative to the weight of the catalyst flowing into the riser is 7 to 13.

14. The method of claim 1, wherein the alumina support has a γ-θ phase at a production temperature of 550 to 850° C., which is not less than the dehydrogenation reaction temperature, and has a surface area of 100 to 300 $m^2/g$ in this range.

15. The method of claim 1, wherein the alumina support has a pore size of 0.1 to 5 μm.

16. The method of claim 1, wherein the alumina support has a pore volume of 0.4 to 0.6 $cm^3/g$.

17. The method of claim 1, wherein the catalyst contains 0.1 to 2% by weight of boron, 2 to 10% by weight of cobalt, and 0.001 to 0.05% by weight of platinum.

18. The method of claim 1, wherein the catalyst has an average size of 20 to 200 microns.

19. The method of claim 1, wherein the catalyst has an average size of 60 to 120 microns.

20. The method of claim 15, wherein:
    the catalyst contains 0.1 to 2% by weight of boron, 2 to 10% by weight of cobalt, and 0.001 to 0.05% by weight of platinum;
    the alumina support has a pore volume of 0.4 to 0.6 $cm^3/g$;
    the catalyst has an average size of 60 to 120 microns;
    the space velocity (WHSV, $h^{-1}$) of the gas relative to the weight of the catalyst flowing into the riser is 7 to 13;
    the catalyst temperature at the inlet of the riser is 620 to 680° C., and the temperature at the bottom of the riser is maintained to be higher than the temperature at the top of the riser; and
    the residence time during which the hydrocarbon mixture stays for the dehydrogenation reaction within the riser is 2.5 to 4.5 seconds.

* * * * *